United States Patent [19]

Abe et al.

[11] Patent Number: 4,535,289
[45] Date of Patent: Aug. 13, 1985

[54] DEVICE FOR MEASURING A POSITION OF A MOVING OBJECT

[75] Inventors: Kunihiro Abe, Higashimurayama; Yoshihiko Morimoto, Hachioji, both of Japan

[73] Assignee: Fuji Jukogyo Kabushiki Kaisha, Tokyo, Japan

[21] Appl. No.: 377,640

[22] Filed: May 13, 1982

[30] Foreign Application Priority Data

May 15, 1981 [JP] Japan .................................. 56-73757

[51] Int. Cl.³ .......................... G01B 7/14; G01R 33/06
[52] U.S. Cl. ...................................... 324/208; 324/235
[58] Field of Search ............... 324/207, 208, 235, 173, 324/174; 310/68 B, 68 E, 156, 168; 340/670, 671, 672, 347 P

[56] References Cited

U.S. PATENT DOCUMENTS

| | | |
|---|---|---|
| 3,230,407 | 1/1966 | Marsh . |
| 3,932,813 | 1/1976 | Gallant ............................ 324/173 X |
| 3,947,711 | 3/1976 | Presley et al. ................... 310/168 X |
| 4,086,533 | 4/1978 | Ricouard et al. ................ 324/208 |
| 4,093,917 | 6/1978 | Haeussermann .................. 324/173 |
| 4,112,366 | 9/1978 | Kouril et al. .................... 324/208 |

FOREIGN PATENT DOCUMENTS

| | | | |
|---|---|---|---|
| 2855635 | 7/1980 | Fed. Rep. of Germany . | |
| 2386039 | 10/1978 | France . | |
| 0058069 | 5/1979 | Japan .................................. | 324/208 |
| 0157810 | 12/1981 | Japan .................................. | 324/208 |
| 0847158 | 9/1960 | United Kingdom ................ | 324/208 |
| 218462 | 9/1968 | U.S.S.R. ............................. | 324/173 |

Primary Examiner—Gerard R. Strecker
Attorney, Agent, or Firm—Martin A. Farber

[57] ABSTRACT

A device for measuring the position of a moving body. A detected member made of magnetic material is secured to the moving body and an E-shaped magnet is arranged adjacent the measured member transverse to the direction of motion. A Hall IC for converting the variation of magnetic flux density of the magnet to the variation of voltage is secured to an end of a central leg portion of the magnet. The measured member is an elongated bar and is provided with a series of projections on the elongated bar at both sides. The projections of both sides are arranged in staggered relation. The Hall IC is adjacent to an inner portion of one of the projections when the moving body travels in the elongated direction. The Hall IC produces an output having a waveform with a zero level interval between inverted waves.

11 Claims, 11 Drawing Figures

DEVICE FOR MEASURING A POSITION OF A MOVING OBJECT

BACKGROUND OF THE INVENTION

The present invention relates to a device for measuring the position of a travelling or rotating object and for converting the measurement into an electrical signal.

A position sensor having a Hall element as a magnetic flux density sensitive device is used for detecting a position of a travelling body of a machine tool or a crankshaft of an internal combustion engine.

The conventional position sensor cannot accurately measure the position of a moving body as described hereinafter in detail.

SUMMARY OF THE INVENTION

The object of the present invention is to provide a position sensor which measures accurately a position of an object without malfunction caused by the variation of the distance between a sensor head and an object and by temperature variation.

According to the present invention, there is provided a device for measuring the position of a moving body comprising: magnetic means for producing a magnetic field; converting means for converting the variation of the magnetic flux density of the magnetic field to the variation of the voltage; and a measured member made of magnetic material for forming magnetic circuits dependent on the magnetic field, passing the converting means and magnetic means; the measured member being so arranged that the polarity of the magnetic circuit for the converting means is alternately inverted with a zero level interval when the converting means and measured member move relatively.

The other objects and features of this invention will be apparently understood from the following description with reference to the accompanying drawings hereinafter.

DETAILED DESCRIPTION OF THE PREFERRED EMBODIMENTS

Figure 1:
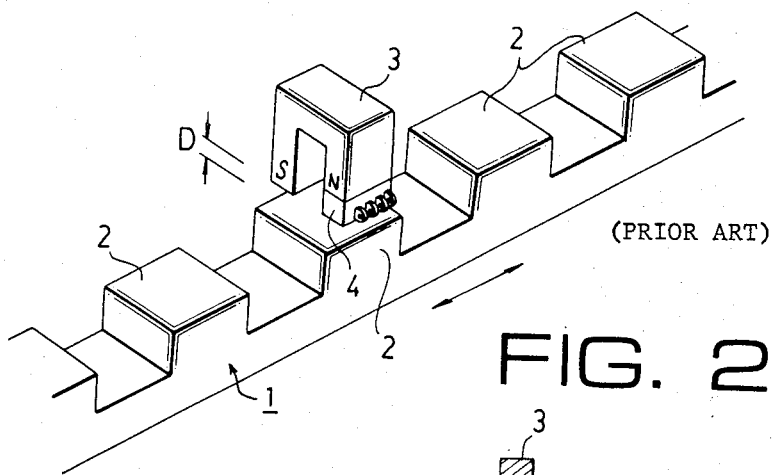
FIG. 1 is a perspective view showing a conventional position sensor.

FIG. 1 shows a conventional position sensor for a travelling body which is disclosed in Japanese Patent Application No. 55-137222. The position sensor, comprises a measured body 1 having a series of projections 2 equidistantly arranged and a U-shaped permanent magnet 3 positioned adjacent a projection. A Hall IC or Hall element 4, as a magnetic flux density responsive device, is secured to the north pole N. The south pole S and the Hall IC 4 are positioned at a distance "D" apart from the upper surface of the projection 2. When the measured body 1 travels in the longitudinal direction, the magnetic flux density for the Hall IC 4 varies in dependency on the movement of the projections 2 and the output voltage of the Hall IC varies with the variation of the magnetic flux density. Accordingly, the travelling distance can be measured by counting the output pulses of the Hall IC.

Figure 3:
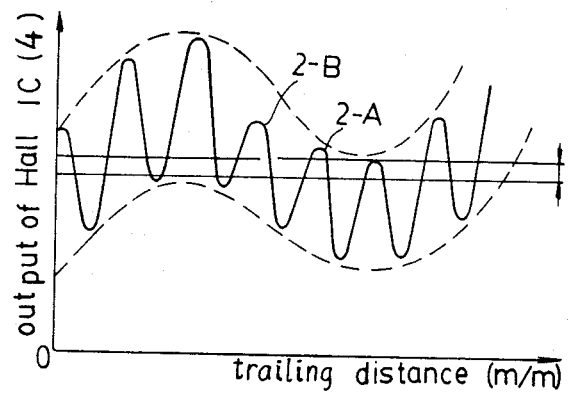
FIG. 3 shows an output waveform of the position sensor of FIG. 1.

However, in this position sensor, if the distance "D" fluctuates, the output voltage of the Hall IC 4 varies, even if the magnetic flux density is constant. Accordingly, the measured body 1 must be exactly shaped and moved so as not to cause a variation of the distance "D". Further, the output of the Hall element varies with the variation of environmental temperature. FIG. 3 shows a variation of the output of the Hall element dependent on variations of the distance "D" and temperature. Because of such a variation of the output of the Hall element, a slice level for deciding a switching level must be set within a narrow range "1". Therefore, if the slice level is set at an improper level, the position of the travelling body cannot be exactly measured.

Figure 2:
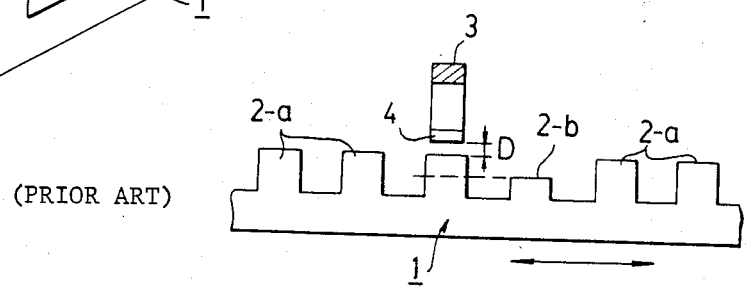
FIG. 2 is a side view of the position sensor of FIG. 1.

On the other hand, it is necessary to select a starting point in order to measure the position of a travelling body. For this purpose, as shown in FIG. 2, it has been proposed to provide a projection 2-b lower than the normal projection 2-a for detecting the starting point. The starting point can be detected by sensing a low magnetic flux density dependent on the lower projection 2-b. However, if the output of the Hall element varies greatly by the variation of the distance "D" and temperature, the starting point cannot be detected. The reason is that, if an output 2-A of the Hall element is less than an output 2-B caused by the lower projection 2-b as shown in FIG. 3, a slice level for detecting only such an output 2-B cannot be established.

Figure 4:
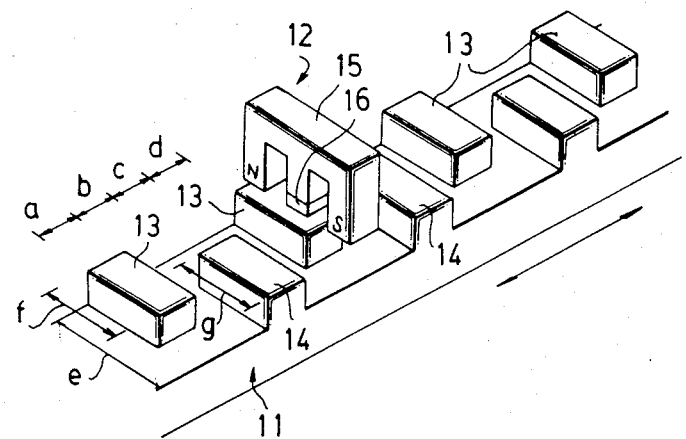
FIG. 4 is a perspective view showing a position measuring device according to the present invention.

The present invention eliminates above-described disadvantages. Referring to FIG. 4 showing a position measuring device according to the present invention, the device comprises a measured or detected member 11 secured to a travelling body (not shown) and a position sensor head 12 supported by a suitable supporting device (not shown). The measured member 11 is made of soft magnetic material such as iron or silicon steel. The measured member is elongated in a moving direction and has a series of projections 13 and 14 along both sides of the measured member. The width "a" of the projection 13 is equal to the width "c" of the projection 14 and each distance "b", "d" is equal to the width "a", "c" respectively. Further, these projections are equal in height. Projections 13 on one side are transversely offset in relation to the projections 14 on the other side. Each length "f", "g" of the projections 13, 14 is longer than half of the width "e" of the measured member 11, so that an inner end portion of each projection is adjacent to a Hall IC 16 as described hereinafter.

Figure 5:
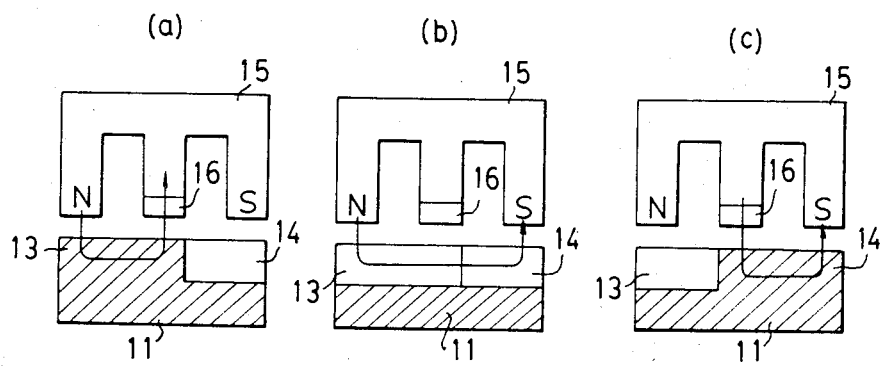
FIGS. 5a to 5c are illustrations for explaining the operation of the position sensing device of the present invention.

The position sensor head 12 comprises a magnet 15 made of hard magnetic material such as alnico or a rare-earth magnet, and the Hall IC 16. The magnet 15 has an E-shaped core with poles N, S at both extreme ends, and the Hall IC 16 is secured to the end of the central leg portion. Referring to FIG. 5, undersides of both poles N, S and the Hall IC 16 are flush with each other and are so arranged that the north pole N is adjacent to the projection 13 and the south pole S is adjacent to the projection 14, and the Hall IC 16 is adjacent to an end portion of each projection.

In operation, when the measured member 11 travels longitudinally as shown by the arrow, each projection 13 and 14 passes alternately through the magnetic field of the magnet 15. When the projection 13 is adjacent to the north pole N as shown in FIG. 5a, the Hall IC 16 is in a magnetic field having a polarity shown by the arrow. On the contrary, when the projection 14 is in the magnetic field as shown in FIG. 5c, the Hall IC 16 is subjected to the magnetic field of inverted polarity. When the magnet 15 is between projections the 13 and 14 as shown in FIG. 5b, the magnetic field does not act on the Hall IC 16.

Figure 6:
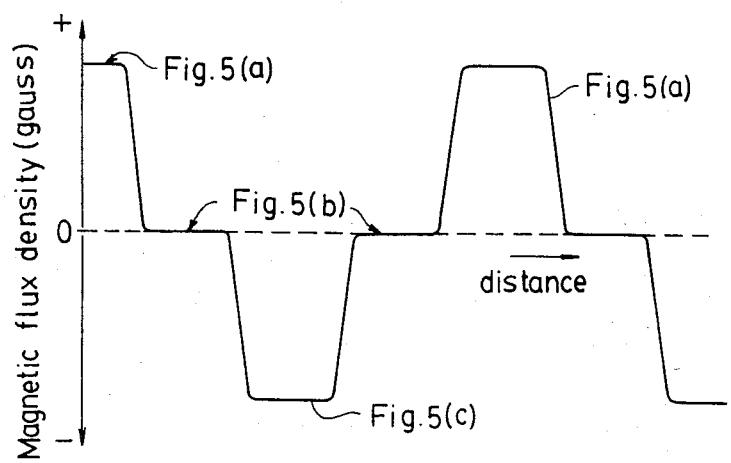
FIG. 6 shows an output waveform of the position sensing device.

FIG. 6 shows the magnetic flux density of the magnetic field acting on the Hall IC 16. The indicating figure references in FIG. 6 correspond to the FIGS. 5(a) to (c). The magnetic flux density varies as a rectangular waveform with the zero level duration and the polarity is inverted with respect to the zero level.

Figure 7:
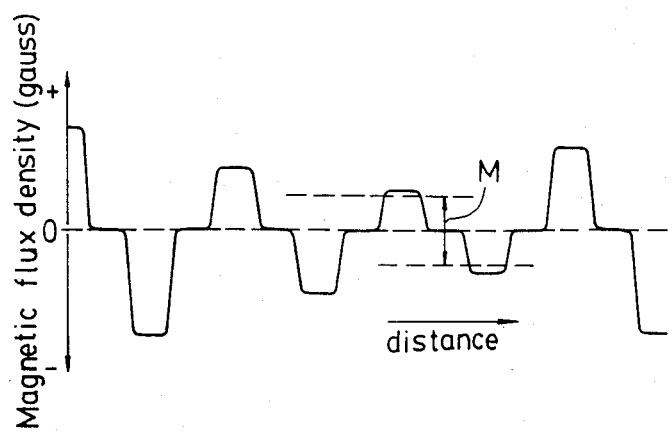
FIG. 7 shows an output waveform when the distance between a sensor head and an object varies.

FIG. 7 shows the variation of the magnetic flux density when the distance between the measured member 11 and the Hall IC 16 fluctuates or environmental temperature varies. Since the magnetic flux density varies with respect to the zero level, a wide range "M" for the slice level setting can be obtained.

Figure 8:
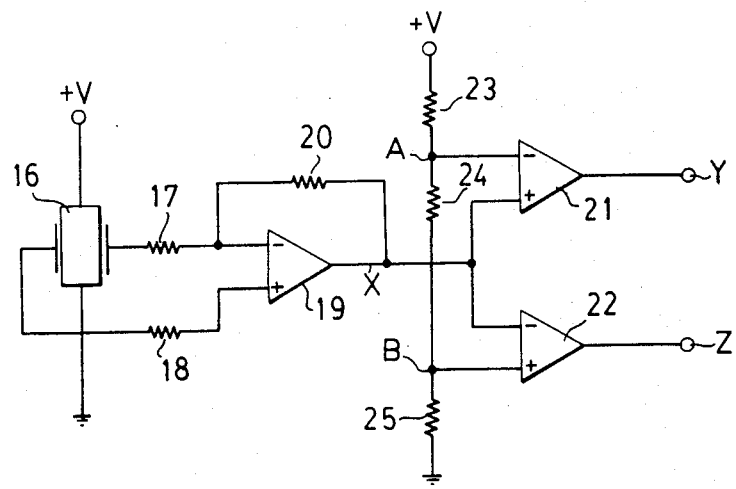
FIG. 8 is an electric circuit for producing an output in the position sensor.

FIG. 8 shows a circuit for producing output pulses with the Hall IC (or Hall element) 16. Output terminals of the Hall IC are connected to inputs of a comparator 19 through resistors 17 and 18. A resistor 20 is connected between the output and the inverting input of the comparator 19. The output of the comparator 19 is connected to a non-inverting input of a comparator 21 and to an inverting input of a comparator 22. Resistors 23, 24 and 25 are connected to the other inputs of the comparators 21 and 22 for applying voltages to the comparators.

Figure 9:
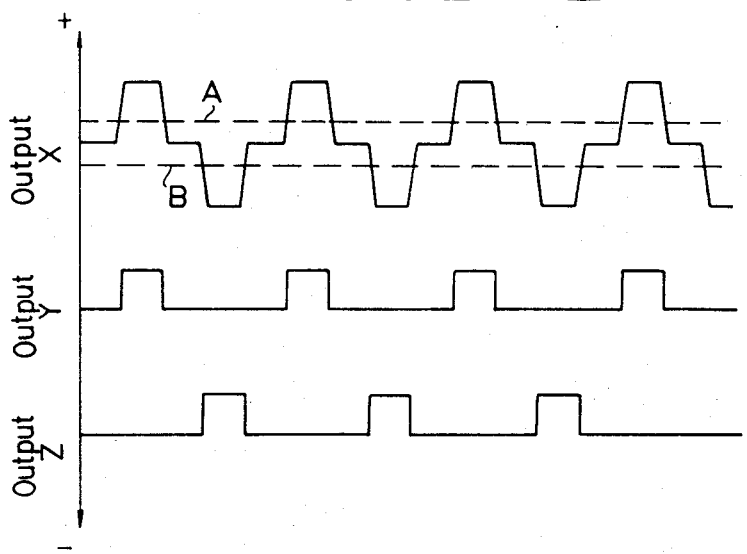
FIG. 9 shows output waveforms in the circuit of FIG. 8.

The output "X" of the comparator 19 is shown in FIG. 9. The output "X" is applied to the comparators 21 and 22 and compared with reference levels A and B (FIG. 9) respectively. Thus, output pulses are produced at outputs Y and Z as shown in FIG. 9. The outputs Y and Z are different in phase. Therefore, one of the outputs can be used as a standard signal for measuring the starting point (previously mentioned), and the other output can be used as a signal for measuring a relative position of the moving body with respect to the starting point.

From the foregoing, it will be understood that the present invention provides a measuring device which may produce two kinds of output signals by a single position sensor head. Thus, the device of the present invention may be made in a small size at a low cost. Although, in the above described embodiment, the Hall element or Hall IC is employed as a device for converting the variation of the magnetic flux density to the variation of voltage, other elements such as magnetoresistors may be employed. Further, it will be understood that the present invention may be used in such a device that the sensor head is secured to the moving body and the measured member is secured to a stationary body.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a device for detecting the position of a moving body, having a sensor member including magnetic means for producing a magnetic field, converting means for converting variation of magnetic flux density of said magnetic field to variation of voltage, and a detected member made of magnetic material and one of said members being secured to said moving body such that said members undergo relative movement, said magnetic means and said detected member being disposed to form a magnetic circuit passing through said converting means, the improvement wherein said detected member includes a plurality of projections arranged one after the other substantially in a direction of motion of said moving body with a space between adjacent of said projections, said spaces being one after the other substantially in said direction of motion of said moving body, said magnetic means including a central end portion and two opposite end portions arranged transverse to the direction of motion of said moving body, said opposite end portions being magnetized in opposite polarity, said converting means being provided on said central end portion, said projections being offset relative to each other transverse to the direction of motion of said moving body and being arranged relative to said end portions of said magnetic means such that the central end portion and alternate of said opposite end portions respectively form the magnetic circuit together with respective of said adjacent projections and the polarity of the magnetic circuit passing through said converting means is alternately inverted, respectively, said circuit having a zero level when each said space between said adjacent projections passes said converting means.

2. The device according to claim 1 wherein said detected member comprises an elongated bar, said projections being of equal length, and said adjacent projections being spaced equidistant from each other in the direction of motion and said spaces between said adjacent projections being equal to the width of each of said projections in the direction of motion.

3. The device according to claim 1 wherein said converting means is a Hall element.

4. The device according to claim 1 wherein said converting means is a Hall IC.

5. The device according to claim 1 wherein said converting means is a magnetoresistor.

6. The device according to claim 1 further comprising circuit means responsive to terminal output signals of said converting means for producing pulses related to the magnitude of said output signals, said circuit means including a first comparator having an inverting input connected to one output signal of said converting means and a non-inverting input connected to the other output signal of said converting means, and a second and a third comparator connected to an output of said first comparator for producing respective series of output pulses.

7. The device according to claim 6 wherein said circuit means incorporates a first slice level and a second slice level for determining respective switching levels for said second and said third comparators.

8. The device according to claim 1 wherein
said detected member comprises an annular member, said motion is rotation, said projections being of equal length, and said adjacent projections being spaced equidistant from each other in the direction of motion.

9. The device according to claim 1 wherein
the length of each said projection is such that each said projection spans only said central end portion and a single one of said alternate opposite end portions of said magnetic means.

10. The device according to claim 1 further comprising
circuit means responsive to an output signal of said converting means for producing pulses related to the magnitude of said output signal, said circuit means including a first comparator having an inverting input connected to said output signal of said converting means and a non-inverting input connected to the output signal of said converting means, and a second and a third comparator connected to an output of said first comparator for producing respective series of output pulses.

11. The device according to claim 1, wherein
the transverse length of each of said projections is greater than half the transverse width of said detected member.

* * * * *